(12) United States Patent
Kazama et al.

(10) Patent No.: US 10,934,170 B2
(45) Date of Patent: Mar. 2, 2021

(54) CARBON NANOTUBE COMPOSITE AND CARBON NANOTUBE WIRE

(71) Applicant: Furukawa Electric Co., Ltd., Tokyo (JP)

(72) Inventors: Yoshinori Kazama, Tokyo (JP); Satoshi Yamashita, Tokyo (JP); Masashige Watanabe, Tokyo (JP); Hirokazu Sasaki, Tokyo (JP); Koji Fujimura, Tokyo (JP); Yuudai Tanimura, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/138,202

(22) Filed: Sep. 21, 2018

(65) Prior Publication Data

US 2019/0031512 A1    Jan. 31, 2019

Related U.S. Application Data

(63) Continuation of application No. PCT/JP2017/011510, filed on Mar. 22, 2017.

(30) Foreign Application Priority Data

Mar. 24, 2016    (JP) .............................. JP2016-060728

(51) Int. Cl.
*B32B 9/00* (2006.01)
*C01B 32/16* (2017.01)
(Continued)

(52) U.S. Cl.
CPC .............. *C01B 32/16* (2017.08); *B82Y 30/00* (2013.01); *C01B 32/168* (2017.08); *D01F 9/127* (2013.01);
(Continued)

(58) Field of Classification Search
CPC ........ B82Y 30/00; Y10T 428/30; H01B 31/04
(Continued)

(56) References Cited

U.S. PATENT DOCUMENTS 6,139,919 A * 10/2000 Eklund .................. B82Y 30/00
427/430.1
2006/0067870 A1    3/2006 Park et al.
(Continued)

FOREIGN PATENT DOCUMENTS

JP         2001-48509 A      2/2001
JP         2014-517797 A     2/2001
(Continued)

OTHER PUBLICATIONS

Do Nascimento et al., "Comparison of the Resonance Raman Behavior of Double-Walled Carbon Nanotubes Doped with Bromine of Iodine Vapors", The Journal of Physics Chemistry C, Mar. 12, 2009, vol. 113, No. 10, pp. 3934-3938, ISSN 1932-7447.
(Continued)

*Primary Examiner* — Daniel H Miller
(74) *Attorney, Agent, or Firm* — Birch, Stewart, Kolasch & Birch, LLP

(57) ABSTRACT

A carbon nanotube composite includes a carbon nanotube bundle including a plurality of carbon nanotubes that are bundled, each of the plurality of carbon nanotubes having a single-walled or multi-walled structure, and a group of elements of other type introduced in an aligned manner into a gap portion between the plurality of carbon nanotubes. In the carbon nanotube bundle, a ratio of the number of carbon nanotubes having a double-walled or triple-walled structure to the number of the plurality of carbon nanotubes is greater than or equal to 50%, and other-type element bonded bodies
(Continued)

constituting the group of elements of other type are arranged in line along a longitudinal direction of the carbon nanotubes.

6 Claims, 10 Drawing Sheets

(51) Int. Cl.
  *B82Y 30/00*    (2011.01)
  *C01B 32/168*   (2017.01)
  *H01B 1/04*    (2006.01)
  *D01F 9/127*   (2006.01)
  *B82Y 40/00*   (2011.01)

(52) U.S. Cl.
  CPC ............... *H01B 1/04* (2013.01); *B82Y 40/00* (2013.01); *C01B 2202/08* (2013.01); *Y10T 428/30* (2015.01)

(58) Field of Classification Search
  USPC .......................................... 428/408; 252/501
  See application file for complete search history.

(56) References Cited

U.S. PATENT DOCUMENTS

| | | | | |
|---|---|---|---|---|
| 2008/0088219 | A1* | 4/2008 | Yoon | B82Y 10/00 |
| | | | | 313/326 |
| 2010/0117032 | A1* | 5/2010 | Grigorian | B82Y 30/00 |
| | | | | 252/507 |
| 2010/0206362 | A1* | 8/2010 | Flood | H01L 31/0336 |
| | | | | 136/252 |
| 2013/0183439 | A1 | 7/2013 | Starkovich et al. | |
| 2014/0084219 | A1 | 3/2014 | Zhao et al. | |
| 2018/0170757 | A1 | 6/2018 | Watanabe et al. | |

FOREIGN PATENT DOCUMENTS

| | | |
|---|---|---|
| JP | 2007-302487 A | 11/2007 |
| JP | 2013-57577 A | 3/2013 |
| JP | 2014-47093 A | 3/2014 |
| WO | WO 2017/033482 A1 | 3/2017 |

OTHER PUBLICATIONS

Duclaux, Review of the doping of carbon nanotubes (multiwalled and single-walled), Carbon, 2002, vol. 40, No. 10, pp. 1751-1764, ISSN 0008-623.

International Search Report, issued in PCT/JP2017/011510, dated May 16, 2017.

Michel et al., "EXAFS investigations of iodine-doped carbon nanotubes", Physical Review B, May 23, 2006, vol. 73, No. 19, pp. 195419-1 to 195419-5, ISSN 1098-0121.

Written Opinion of the International Searching Authority, issued in PCT/JP2017/011510, dated May 16, 2017.

International Preliminary Report on Patentability; English Translation of Written Opinion of the International Searching Authority, dated Sep. 25, 2018, issued in PCT/JP2017/011510 (Forms PCT/IB/373 and PCT/ISA/237).

Cambedouzou et al., "Raman Spectroscopy of Iodine-doped Double-walled Carbon Nanotubes," Physics Review B, vol. 69, Oct. 26, 2004, pp. 1-15, XP080169483.

Claves, "Hole-Doping of Fullerenes and Nanotubes by Way of Intercalation Chemistry," Journal of Nanoscience and Nanotechnology, vol. 7, No. 4/5, 2007, pp. 1221-1238, XP008143965.

Extended European Seach Report, dated Nov. 22, 2019, for corresponding European Application No. 17770289.1.

Fujimori et al., "Effect of Selectively intercalated Polyiodide on the Electric Transports of Metallic- and Semiconducting-enriched Single-wall Carbon Nanotube Networks," Applied Physics Letters, vol. 108, No. 26, 2016 (Published online Jun. 30, 2016), pp. 263111-1-263111-5, XP012208870.

Grigorian et al., "Atomic Size-limited intercalation into Single Wall Carbon Nanoubes," Nanotechnology, vol. 18, 2007 (Published Oct. 4, 2007), pp. 1-5, XP020119755.

Grigorian et al., "Reversible Intercalation of Charged Iodine Chains into Carbon Nanotube Ropes," Physical Review Letters, vol. 80, No. 25, Jun. 22, 1998, pp. 5560-5563, XP002549046.

Zhao et al., "Iodine Doped Carbon Nanotube Cables Exceeding Specific Electrical Conductivity of Metals," Scientific Reports, vol. 1, No. 83, Published Sep. 6, 2011 (Sep. 1, 2011), pp. 1-5, XP055250585.

Japanese Office Action dated Aug. 11, 2020 in corresponding JP application No. 2018-507378, with machine translation.

* cited by examiner

CARBON NANOTUBE COMPOSITE AND CARBON NANOTUBE WIRE

CROSS REFERENCE TO RELATED APPLICATIONS

This is a continuation application of International Patent Application No. PCT/JP2017/011510 filed Mar. 22, 2017, which claims the benefit of Japanese Patent Application No. 2016-060728, filed Mar. 24, 2016, the full contents of both of which are hereby incorporated by reference in their entirety.

BACKGROUND

Technical Field

The present disclosure relates to a carbon nanotube composite in which a carbon nanotube bundle including a plurality of carbon nanotubes that are bundled is doped with elements of other type, and to a carbon nanotube wire including the carbon nanotube composites that are bundled.

Background

In the related art, an electric wire which includes a core line including one or more wires and an insulation coating covering the core line is used as a power line or a signal line in various fields such as automobiles and industrial equipment. From the electrical properties point of view, copper or a copper alloy is usually used as a material of a wire forming the core line. However, in recent years, from the lightweighting point of view, aluminum or an aluminum alloy is proposed. For example, the specific gravity of aluminum is about one-third of the specific gravity of copper and the electrical conductivity of aluminum is about two-thirds of the electrical conductivity of copper (in a case where pure copper is a standard for 100% IACS, pure aluminum has about 66% IACS). Then, in order to allow an electric current which is the similar as that through the copper wire to flow, the cross-sectional area of an aluminum wire needs to be about 1.5 times greater than the cross-sectional area of a copper wire. However, even if an aluminum wire having an increased cross-sectional area as described above is used, the use of aluminum wires is advantageous from the lightweighting point of view, since the mass of an aluminum wire is about half the mass of a pure copper wire.

Under the background as described above, with recent advancements in performance and functions of automobiles, industrial equipment, and the like, the number of various electrical devices, control devices, and the like to be installed tends to increase, and the number of wirings of electric wiring bodies used for these devices also tends to increase. On the other hand, for environmental friendliness, lightweighting of wires is strongly desired for improving the fuel efficiency of movable bodies such as automobiles.

As one of novel means for achieving further lightweighting, a technique of utilizing a carbon nanotube as a wire is newly proposed. The carbon nanotube is a three-dimensional network structure body including a single-walled or a substantially coaxially arranged multilayer of a tubular body having a hexagonal lattice network structure. Since the carbon nanotube is lightweight and has excellent properties such as conductivity, current capacity, elasticity, and mechanical strength, the carbon nanotube is attracting attention as a substitute material for the metals used in power lines or signal lines.

The specific gravity of the carbon nanotube is about one-fifth of the specific gravity of copper (about one-half of aluminum). A carbon nanotube simple substance exhibits higher conductivity than that of copper (resistivity: $1.68 \times 10^{-6}$ Ω·cm). Therefore, theoretically, if a plurality of carbon nanotubes are twisted to form a carbon nanotube aggregate, further lightweighting and higher electrical conductivity can be achieved. However, when carbon nanotubes on the scale of nanometers are twisted to produce a carbon nanotube aggregate on the scale of micrometers to millimeters, there is the drawback that contact resistance between the carbon nanotubes and internal defect formation cause an increased resistance value of the whole wire, which makes it difficult to use carbon nanotubes as they are in a wire.

Then, a method for controlling the network structure (chirality) of carbon nanotubes which are constitutional units and subjecting the carbon nanotubes to a doping treatment is proposed as one of methods for improving the conductivity of a carbon nanotube aggregate.

For example, there is a method for subjecting double-walled carbon nanotubes and multi-walled carbon nanotubes to a doping treatment using at least one dopant. In the method, when forming carbon nanotubes, or after a carbon nanotube wire is formed, a doping treatment is performed by sputtering, spraying, immersing, or gaseous phase introduction, to produce a carbon nanotube wire having a dopant containing iodine, silver, chlorine, bromine, fluorine, gold, copper, aluminum, sodium, iron, antimony, arsenic, or a combination thereof. This can provide electrical properties such as high specific electrical conductivity, low resistivity, high current-carrying capacity, and thermal stability (for example, National Publication of International Patent Application No. 2014-517797).

It is known that a metal material such as copper or aluminum shows an increase in lattice vibration as the temperature increases, and the electrical resistance increases. For example, a material for windings of an in-wheel motor coaxially attached to a hub of a vehicle such as an electric automobile is used in a temperature environment of about 110° C. (383.15 K), and the material for windings loses as much as about 33% of electric energy compared to the case where the material for windings is used in a temperature environment equivalent to that of a vehicle compartment. Therefore, considering an improvement in an energy efficiency and an improvement in performance of a vehicle, an alternative material is required which can reduce an electric energy loss in high temperature environments when used as a wire.

However, the aforementioned Patent Literature merely discloses that a carbon nanotube aggregate in which double-walled carbon nanotubes are doped with iodine has resistivity of $1.55 \times 10^{-5}$ Ω·cm. That is, as compared to copper resistivity of $1.68 \times 10^{-6}$ Ω·cm or aluminum resistivity of $2.65 \times 10^{-6}$ Ω·cm, the resistivity of the carbon nanotube aggregate is greater by an order of magnitude or more, and thus the carbon nanotube aggregate cannot be said to be sufficient as a wire material substituting copper and aluminum. Also, since high performance and high function in each industrial field are predicted to progress rapidly and exponentially, there is a need for achieving an even lower resistivity.

The aforementioned Patent Literature merely discloses that, in a temperature range of 200 K to 400 K, the relative resistance (R−R')/R', where R' is room temperature resistance, of a copper wire doped with iodine is 43%, whereas, the relative resistance of a double-walled carbon nanotube fiber doped with iodine is 9%. That is, the aforementioned Patent Literature merely discloses that the resistance change rate depending on the temperature of the carbon nanotube fiber doped with iodine is smaller than the resistance change rate of the copper wire doped with iodine. Neither the arrangement position of a dopant in the carbon nanotube fiber nor the relationship between the arrangement position of the dopant and the resistivity of the carbon nanotube fiber are disclosed.

The present disclosure is related to providing a carbon nanotube composite and a carbon nanotube wire which can achieve further lower resistance than that of a carbon nanotube composite of the related art, can achieve resistivity equivalent to that of copper or aluminum, and can greatly improve electrical properties even in high temperature environments.

SUMMARY

According to a first aspect of the present disclosure, a carbon nanotube composite includes a carbon nanotube bundle including a plurality of carbon nanotubes that are bundled, each of the plurality of carbon nanotubes having a single-walled or multi-walled structure, and a group of elements of other type introduced in an aligned manner into a gap portion between the plurality of carbon nanotubes. In the carbon nanotube bundle, a ratio of the number of carbon nanotubes having a double-walled or triple-walled structure to the number of the plurality of carbon nanotubes is greater than or equal to 50%. Other-type element bonded bodies constituting the group of elements of other type are arranged in line along a longitudinal direction of the carbon nanotubes.

According to a second aspect of the present disclosure, a carbon nanotube wire includes a plurality of carbon nanotube composites as described above that are bundled.

According to the present disclosure, a group of elements of other type is introduced into a gap portion between the plurality of carbon nanotubes constituting the carbon nanotube bundle. Accordingly, many carrier can be generated on the outermost wall of the carbon nanotubes or on the first inner wall or n-th inner wall from the outermost wall, and thus the number of the carriers contributing to conductivity can be increased and the conductivity of the carbon nanotubes can be improved. Accordingly, higher conduction than that of carbon nanotube composites subjected to a doping treatment of the related art can be achieved. Therefore, a carbon nanotube composite and a carbon nanotube wire which have greatly improved electrical properties can be provided. With the group of elements of other type introduced into the gap portion of the carbon nanotube bundle, an increase in the lattice vibration of the carbon nanotubes caused by a temperature increase is suppressed. Accordingly, a carbon nanotube composite having an excellent resistance temperature coefficient can be provided, and electrical properties can be greatly improved even in high temperature environments.

With the carbon nanotube bundle including CNTs having the number of walls (two wall or three wall) that can maximize an effect of a doping treatment, a resistance even lower than that of a carbon nanotube wire of the related art can be achieved, and a resistivity that is substantially equivalent to the resistivity of copper ($1.68 \times 10^{-6}$ $\Omega \cdot cm$) or the resistivity of aluminum ($2.65 \times 10^{-6}$ $\Omega \cdot cm$) can be achieved.

BRIEF DESCRIPTION OF DRAWINGS

FIGS. 1A to 1F are diagrams schematically showing the configuration of a carbon nanotube wire according to an embodiment of the present disclosure, wherein FIGS. 1A and 1B show a perspective view and electron microscope image of the carbon nanotube wire, respectively; FIGS. 1C and 1D show a perspective view and electron microscope image of a carbon nanotube composite, respectively; and FIGS. 1E and 1F show a perspective view and electron microscope image of carbon nanotubes forming the carbon nanotube composite, respectively.

FIG. 3A is a top view and FIG. 3B is a front view.

FIG. 9A shows a result of measurement of carbon nanotube composites in Examples, and FIG. 9B shows a result of measurement of carbon nanotube composites in Comparative Examples.

DETAILED DESCRIPTION

Further features of the present disclosure will become apparent from the following detailed description of exemplary embodiments with reference to the accompanying drawings.

FIGS. 1A to 1F are diagrams schematically showing the configuration of a carbon nanotube wire according to an embodiment of the present disclosure. The carbon nanotube wire shown in FIGS. 1A to 1F is an example thereof, and the shape, dimension, and the like of each configuration according to the present disclosure are not limited to those in FIGS. 1A to 1F.

<Configuration of Carbon Nanotube Wire>

Figure 1A:
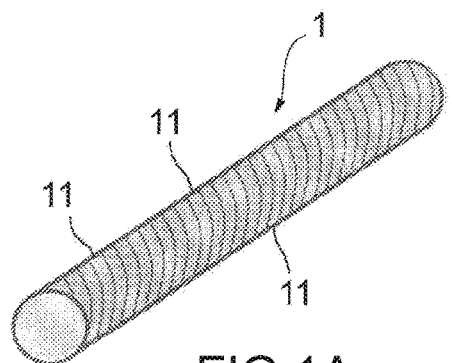
Figure 1B:
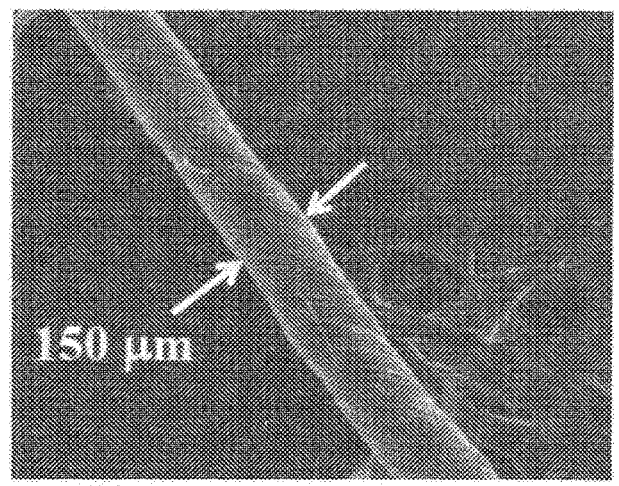

As shown in FIGS. 1A and 1B, a carbon nanotube wire 1 (hereinafter, referred to as a CNT wire) according to the present embodiment is composed of a plurality of carbon nanotube composites 11, 11, . . . (hereinafter, referred to as CNT composite) that are bundled, each of the plurality of carbon nanotube composites including a bundle of carbon nanotubes doped with elements of other type. Each of the carbon nanotubes has a single-walled or multi-walled structure. The outer diameter of the CNT wire 1 is 0.01 to 10 mm, and more preferably 0.01 to 1 mm.

Figure 1C:
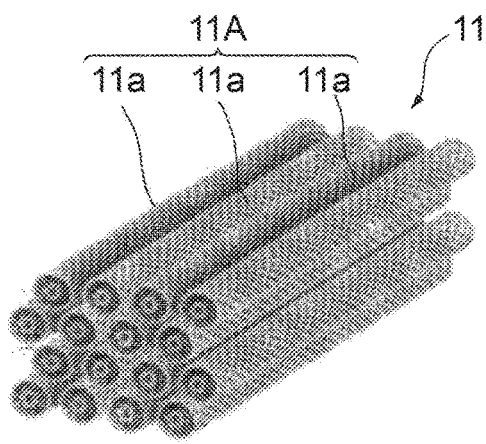
Figure 1D:
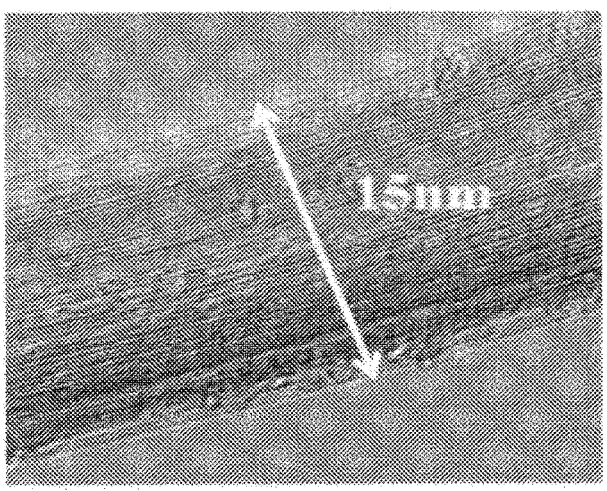
Figure 1E:
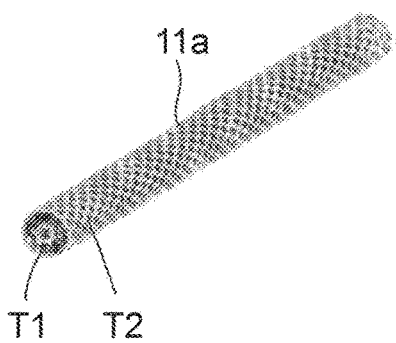
Figure 1F:
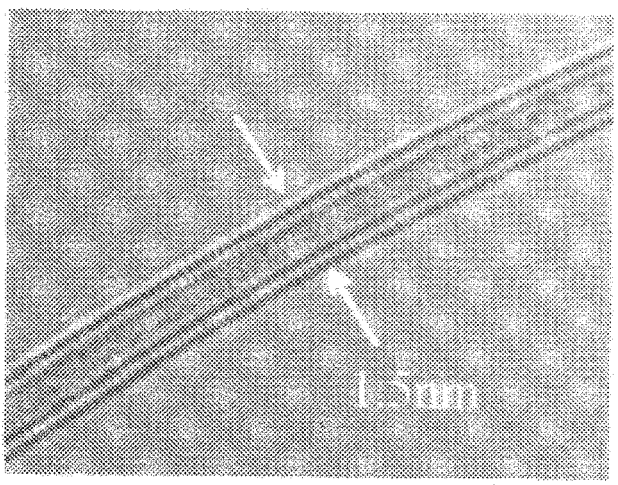

As shown in FIGS. 1C and 1D, the CNT composite 11 is a bundle body in which a plurality of carbon nanotubes 11a, 11a, . . . (hereinafter, referred to as CNT) are gathered, and axial directions of the plurality of CNTs are arranged in substantially the same orientation. The CNT bundle is doped with elements of other type. In the present embodiment, a CNT bundle 11A doped with elements of other type is referred to as a CNT composite.

The CNT 11a is a tubular body having a single-layer structure or a multilayer structure. The CNT 11a having a single-layer structure and the CNT 11a having a multilayer structure are referred to as a single-walled nanotube (SWNT) and a multi-walled nanotube (MWNT), respectively. In FIGS. 1C to 1F, only CNTs having a double-walled structure are illustrated for convenience, but in practice, CNTs having a triple-walled structure exist. CNTs having a single-walled structure or a four or more-walled structure may be included in the CNT bundle 11A, but in a less quantity than the CNTs having a double-walled or a triple walled structure.

<Configuration of CNT Composite>

Figure 2:
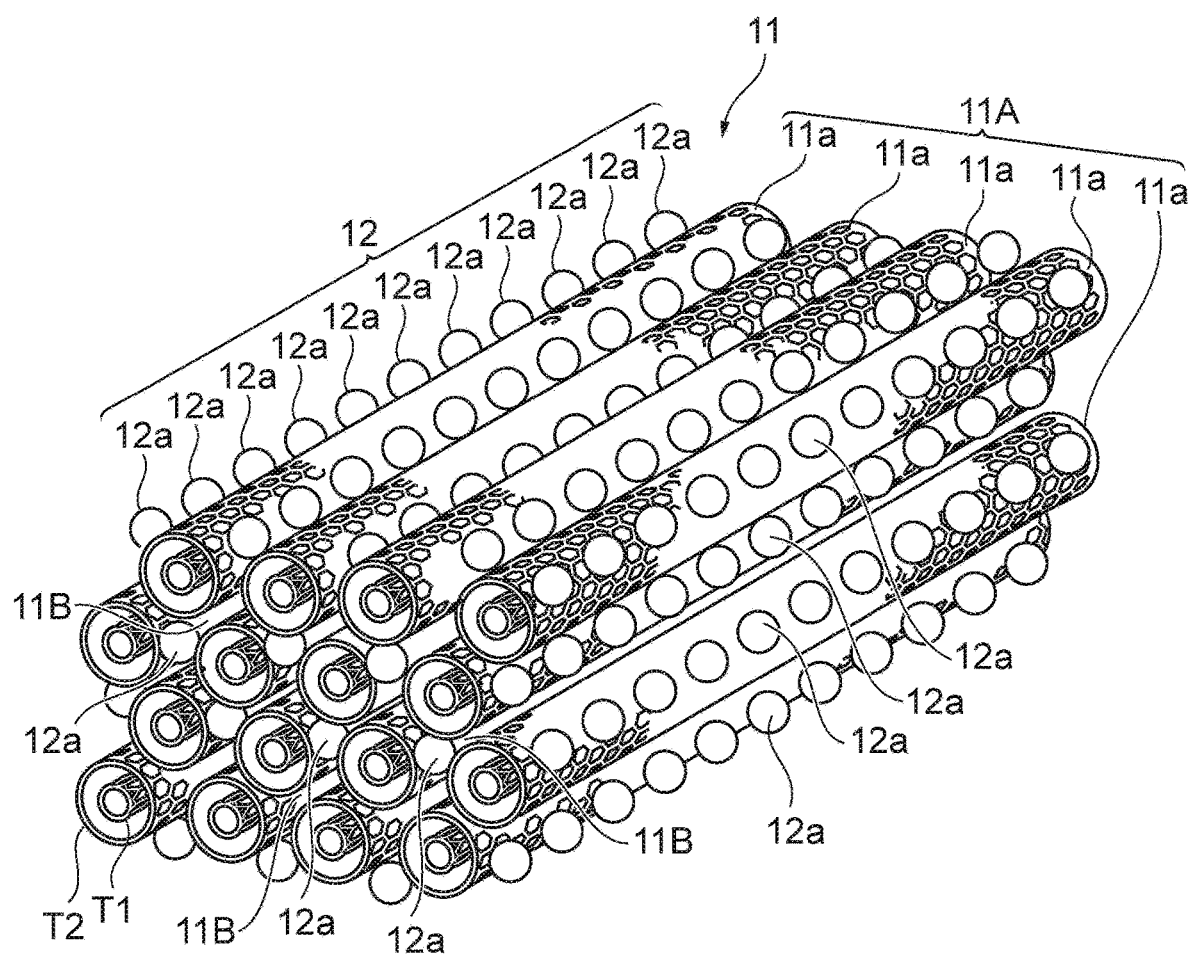
FIG. 2 is a schematic diagram showing the detailed configuration of the carbon nanotube composite of FIG. 1C.

FIG. 2 is a schematic diagram showing a detailed configuration of the CNT composite 11 shown in FIG. 1C. For convenience of explanation, each component in FIG. 2 is illustrated with a dimension, a shape, and the like different from the actual ones. Each component of the CNT composite in the present disclosure is not limited to that shown in FIG. 2.

As shown in FIG. 2, the CNT composite 11 includes the CNT bundle 11A in which the plurality of CNTs 11a, 11a, . . . having a double-wall structure are bundled, and a group of elements of other type 12 introduced in an aligned manner into a gap portion 11B between the plurality of CNTs 11a, 11a, . . . . In the present embodiment, a plurality of gap portions 11B are formed between outermost walls of the plurality of CNTs 11a, 11a, . . . . A plurality of elements of other type 12a, 12a, . . . are arranged in each of the plurality of gap portions 11B. The gap portions 11B are formed along the longitudinal direction of the CNT bundle 11A, and the plurality of elements of other type 12a arranged in the gap portions are also arranged in line along the longitudinal direction of CNT bundle 11A, in other words, the longitudinal direction of the CNT 11a. The gap portions 11B are preferably filled with the plurality of elements of other type 12a constituting the group of elements of other type 12.

(Configuration of CNT)

The CNTs 11a constituting the CNT bundle 11A is each a three-dimensional network structure body in which two tubular bodies T1 and T2 each having a hexagonal lattice network structure are substantially coaxially arranged (FIG. 2A), and is referred to as double-walled nanotube (DWNT). A hexagonal lattice which is a constitutional unit is a six membered-ring in which a carbon atom 11a-1 (see FIGS. 3A and 3B) is arranged at each vertex. The six membered-ring is adjacent to another six membered-ring, and the six membered-rings are sequentially coupled.

The property of the CNT 11a depends on the chirality of the tubular body as described above. The chirality is broadly categorized into an armchair type, a zigzag type, and other than these, a chiral type. The armchair type, the chiral type, and the zigzag type show metallic behavior, semiconducting behavior, and intermediate behavior thereof, respectively. Therefore, the conductivity of the CNT greatly varies depending on which chirality the CNT has. In order to improve the conductivity of a CNT aggregate, it has been considered important to increase the percentage of the armchair type CNT exhibiting the metallic behavior. On the other hand, it has been found that, by doping the chiral type semiconducting CNT with a substance (element of other type) having an electron-donating property or an electron-accepting property, the CNT exhibits a metallic behavior. In the case of a general metal, doping with elements of other type causes scattering of conduction electrons in the metal, and the conductivity decreases. In the same way, when a metallic CNT is doped with elements of other type, the conductivity decreases.

Thus, since it can be said that the doping effects on the metallic CNT and the semiconducting CNT have a trade-off relationship from the conductivity point of view, it is theoretically desirable to separately produce the metallic CNT and the semiconducting CNT and to apply a doping treatment only to the semiconducting CNT, and thereafter combining these CNTs. However, with present manufacturing process techniques, it is difficult to selectively and separately produce the metallic CNT and the semiconducting CNT. The metallic CNT and the semiconducting CNT are produced in a state where the CNTs are mixed. For this reason, in order to improve the conductivity of the CNT wire composed of a mixture of the metallic CNT and the semiconducting CNT, it is preferable to select a CNT structure with which a doping treatment using elements or molecules of other type becomes effective.

In the CNT bundle 11A formed of an aggregate of the plurality of CNTs 11a, 11a, . . . , the ratio of the sum of the number of the CNTs having a double-walled structure or a triple-walled structure to the number of the plurality of CNTs 11a, 11a, . . . is preferably greater than or equal 50%, and more preferably greater than or equal to 75%. That is, it can be represented by the following formula (1):

$$(N_{CNT(2)}+N_{CNT(3)})/N_{TOTAL} \times 100(\%) \geq 50(\%) \quad (1),$$

where the total number of all CNTs constituting a single CNT bundle is $N_{TOTAL}$;

the sum of the number of CNTs (2) having a double-walled structure among all the CNTs is $N_{CNT\,(2)}$; and the sum of the number of CNTs (3) having a triple-walled structure among all the CNTs is $N_{CNT\,(3)}$.

CNT having less layers such as a double-walled structure or a triple-walled structure has comparatively higher conductivity than that of a CNT having more layers. A dopant is introduced into the innermost walls of the CNT, or a clearance formed between the plurality of CNTs. The interlayer distance of the CNT is 0.335 nm, which is equivalent to the interlayer distance of graphite, and thus, in the case of a multi-walled CNT, it is difficult for the dopant to enter between the layers in terms of the size. Although a doping effect is exhibited by introducing the dopant into the inside of and to the outside of the CNT, in the case of the multi-walled CNT, for the above reason, the doping effect of the tube located in the inside without being in contact with the outermost wall and the innermost wall is less likely to be exhibited. For the above reasons, when the CNTs having a multi-walled structure are each subjected to a doping treatment, the doping effect in the CNTs having a double-walled structure or a triple-walled structure is the highest. In many cases, the dopant is a highly reactive reagent exhibiting strong electrophilicity or nucleophilicity. The CNT having a single-walled structure has lower rigidity and poorer chemical resistance than those of the CNTs having a multi-walled structure. Therefore, when the CNT having a single-walled structure is subjected to a doping treatment, the structure of the CNT itself may break. Accordingly, regarding the present disclosure, the focus is on the number of the CNTs having a double-walled structure or a triple-walled structure included in the CNT aggregate. When the ratio of the sum of the number of the CNTs having a double-walled structure or a triple-walled structure is less than 50%, the ratio of the CNTs having a single-walled structure or a multi-walled structure having four or more layers is high. Accordingly, the doping effect as the whole CNT aggregate is small, and high electrical conductivity is less likely to be obtained. Therefore, the ratio of the sum of the number of the CNTs having a double-walled structure or a triple-walled structure is set to a value within the above range.

The outer diameter of the outermost wall of the CNT constituting the CNT bundle 11A is preferably 5.0 nm or less. When the outer diameter of the outermost wall of the CNT constituting the CNT bundle 11A is greater than 5.0 nm, a void ratio due to the clearance between the CNTs and in the innermost wall increases. This causes a decrease in conductivity, which is not preferable.

The CNTs constituting the CNT bundle 11A preferably have no defects, but the CNTs may have defects. In the case where the CNTs having defects is doped with elements of other type, the adsorptive property of the CNT composite including the CNT having defects is improved as compared to the case where the CNT having no defects is doped with the same elements of other type. Thus, it is inferred that the stability of the dopant can be further improved by allowing the dopant to adsorb to the defects.

(Arrangement of Elements of Other Type in CNT Composite)

Figure 3A:
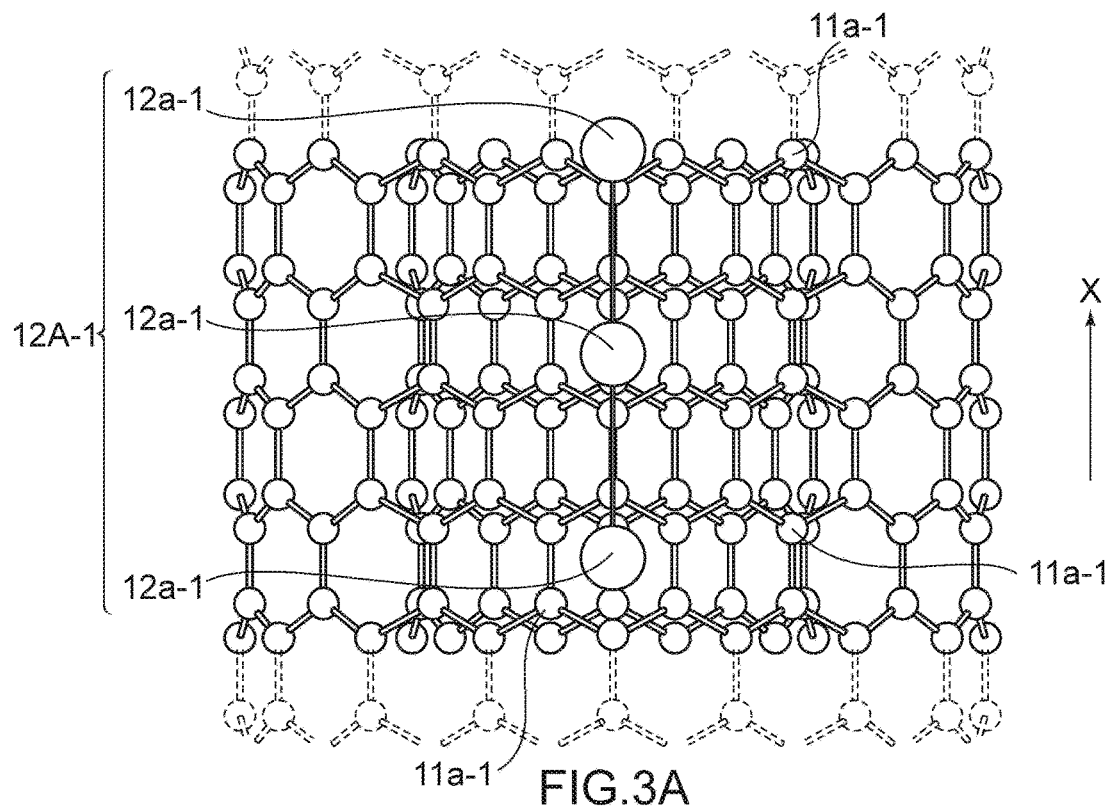
FIGS. 3A and 3B are diagrams showing an exemplary arrangement of constitutional units constituting a group of elements of other type that is being doped.
Figure 3B:
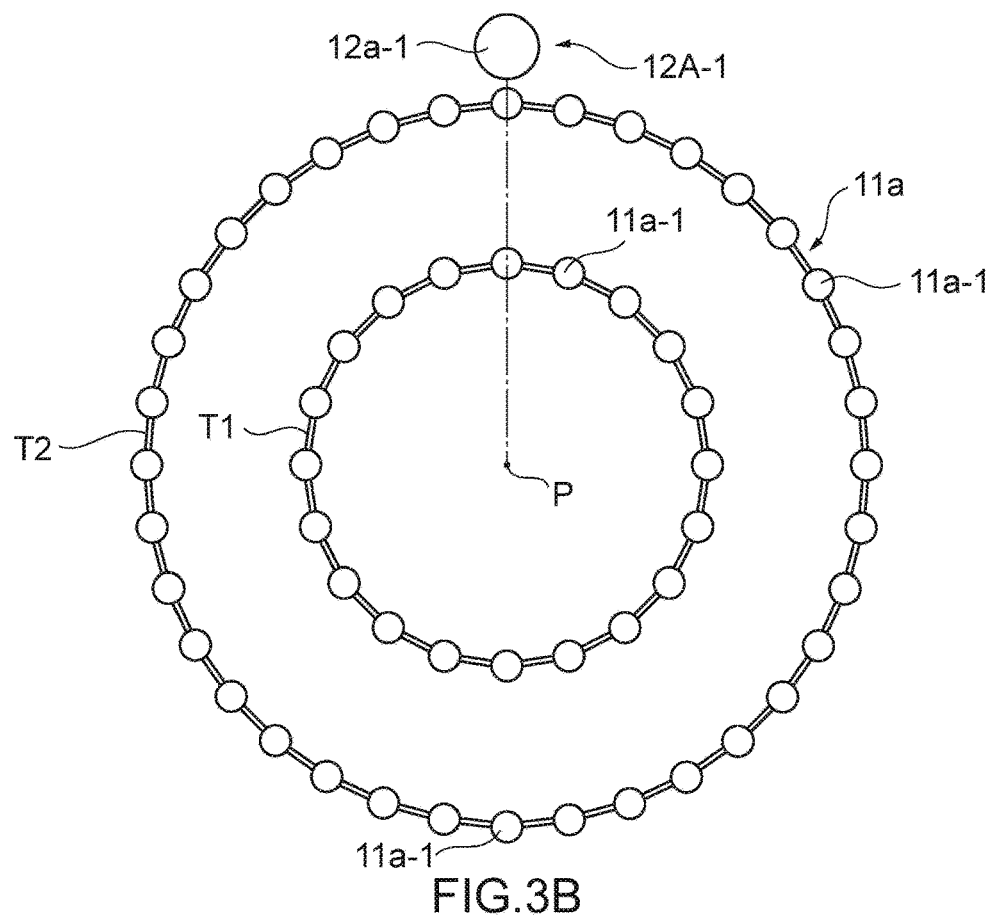
Figure 4:
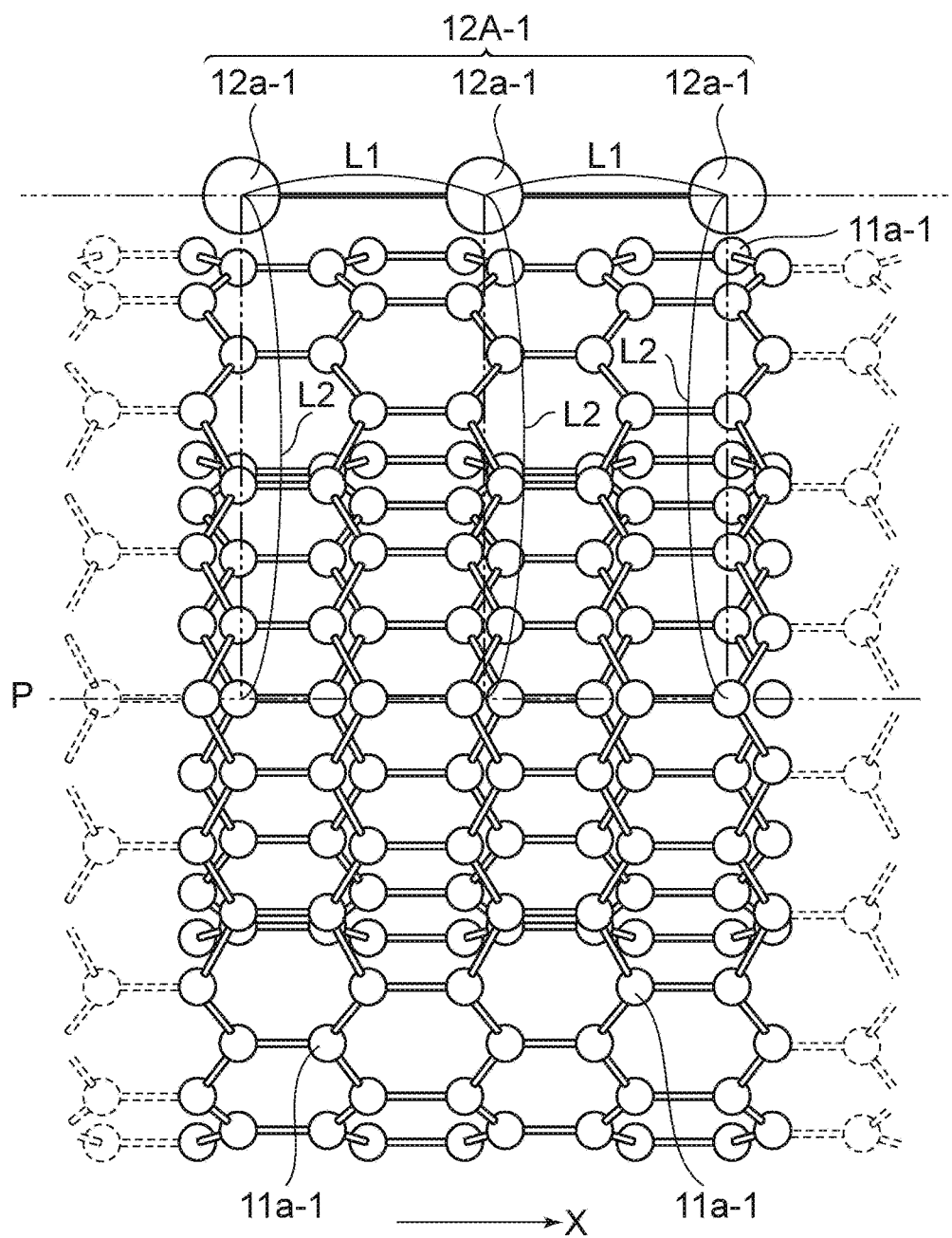
FIG. 4 is a side view showing an exemplary arrangement of constitutional units constituting a group of elements of other type that is being doped.

FIGS. 3A and 3B are diagrams showing an exemplary arrangement of the constitutional unit constituting the group of elements of other type 12 that is being doped. FIG. 3A is a top view, FIG. 3B is a front view, and FIG. 4 is a side view. FIGS. 3A, 3B and FIG. 4 illustrates, by way of example, a case where the groups of elements of other type 12 is a group of polyiodides, and the constitutional unit of the group of polyiodides is an iodine bonded body composed of a plurality of iodides that are linearly connected.

As shown in FIG. 3A, a plurality of iodine elements (elements of other type) 12a-1, 12a-1, . . . constituting an iodine bonded body 12A-1 (other-type element bonded body) are arranged in line along the longitudinal direction X of the CNT 11a. When the iodine bonded body 12A-1 is composed of polyiodide ($I_3$), for example, three iodine elements are arranged in line along the longitudinal direction X of the CNT 11a. A distance L1 between the iodine elements 12a-1 and 12a-1 adjacent to each other in the iodine bonded body 12A-1 is 2.6 angstroms to 3.0 angstroms (Å). It is inferred that, by arranging the polyiodide ($I_3$) as described above, many carriers can be generated on the outermost wall (T2) of the CNT 11a and improved conductivity of the CNT 11a is provided.

When the polyiodide ($I_3$) is used as the dopant, the polyiodide ($I_3$) is mainly present as a polyiodide ion ($I_3^-$). This polyiodide ion receives an electron from the CNT. Therefore, it is inferred that the conductivity of the CNT bundle 11A is improved by doping the CNT 11a with the iodine 12a-1. In the case where the iodine bonded body 12A-1 is composed of other polyiodide, for example, polyiodide ($I_5$), it is similarly inferred that polyiodide composed of five iodine elements or a polyiodide ion ($I_5^-$) is arranged in line along the longitudinal direction X of the CNT 11a. Thereby, it is inferred that the lattice vibration of the CNT 11a due to a temperature increase is inhibited.

The plurality of elements of other type 12a, 12a, . . . forming the other-type element bonded body are each preferably arranged at a certain distance from the center of a radial-direction cross section of the CNT 11a. When the other-type element bonded body is composed of the polyiodide ($I_3$), the three iodine elements 12a-1 are each arranged at a certain distance L2 from a center P of a radial-direction cross section of the CNT 11a in the iodine bonded body 12A-1 (FIG. 3B and FIG. 4). Such an orientation of the polyiodide can prevent a variation in an interval between the outermost wall (T2) of the CNT 11a and each element in the iodine bonded body. Thus, the lattice vibration of the CNT due to a temperature increase can be further inhibited.

(Kind and Content of Elements of Other Type)

FIGS. 3A, 3B and FIG. 4 illustrate the case where the other-type element bonded bodies constituting the group of elements of other type 12 is polyiodide. However, the other-type element bonded bodies may be composed of different elements of other type. That is, it is possible to use not only a p-type dopant such as a group 17 element including iodine, but also an n-type dopant such as a group 1 element including lithium and a group 2 element including strontium. Specifically, the element of other type is preferably at least one element selected from the group consisting of lithium (Li), sodium (Na), potassium (K), calcium (Ca), rubidium (Rb), cesium (Cs), strontium (Sr), barium (Ba), fluorine (F), chlorine (Cl), bromine (Br), or iodine. At least one element of other type selected from the aforementioned group may be present in an atomic or molecular or ionic state. Thereby, the stability of the dopant is good. Since the stable dopant is located on the CNT 11a, it can stably exhibit good temperature properties.

Figure 5:
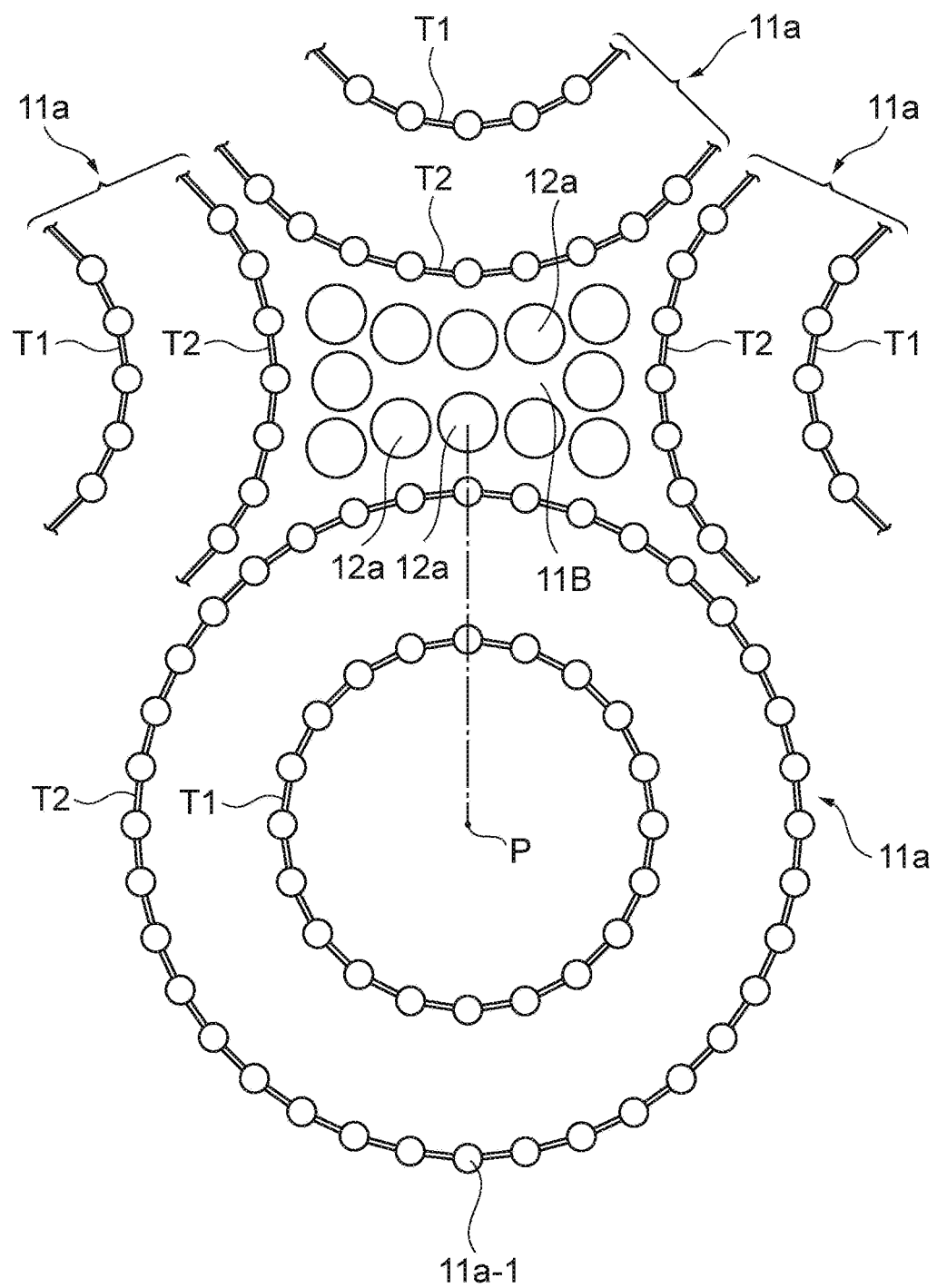
FIG. 5 is a front view showing an example of a state where gap portions of a carbon nanotube bundle are filled with a plurality of constitutional units constituting groups of elements of other type.

The content of the element of other type 12a in the CNT composite 11 is preferably greater than or equal to 1% by atom (0.71% by mass) in an atomic composition percentage. In particular, when the element of other type 12a is iodine, the content of iodine is more preferably greater than or equal to 1% by atom and less than or equal to 2.5% by atom in an atomic composition percentage. The plurality of elements of other type 12a, 12a, . . . constituting the group of elements of other type 12 are arranged in line along the longitudinal direction of the CNT 11a, and are being doped in an amount within the above range. Thus, as shown in the front view of FIG. 5, the gap portion 11B of the CNT bundle 11A is filled with the elements of other type 12a in an aligned manner. Thereby, the filling rate of the elements of other type in the gap portion 11B is increased. Thus, the number of carriers on the outermost wall (T2) of the CNT 11a is further increased, and the lattice vibration of the CNT due to a temperature increase is further inhibited.

<Ratio of Peak Originating from Polyiodide to Peak of G Band Originating from the Carbon Nanotube pI/G is Greater than or Equal to 0.2>

When a carbon-based substance is analyzed using Raman spectroscopy, a peak of a spectrum originating from the in-plane vibration of a six membered-ring called G band is detected near a Raman shift of 1590 $cm^{-1}$. Since the shape of the CNT is cylindrical, the G band is split into two, and the peaks of two spectra, that is, a G+ band and a G− band appear. The G+ band and the G− band correspond to a longitudinal wave (LO) mode in a CNT axial direction and a traverse-wave (TO) mode perpendicular to the axial direction, respectively. The peak of the G+ band appears near 1590 $cm^{-1}$ independent of the outer diameter of the CNT, and in contrast, the peak of the G− band appears shifted from the G+ band in inverse proportion to the square of the outer diameter of the CNT.

The G band of the metallic CNT appears split into the G+ band and the G− band as described above, but the peaks thereof are small, and the peak of the G+ band is particularly small. On the other hand, the semiconducting CNT is also split into the G+ band and the G− band, but the peak of the G+ band is much larger than that of the G+ band of metallic CNT. Therefore, it is inferred that when the ratio of the G+ band in the G band is high, the CNT exhibits a semiconducting behavior, and it can also be similarly inferred for the CNT aggregate.

Based on the properties of the spectrum peak described above, for the CNT composite 11 of the present embodiment, when the element of other type is, for example, polyiodide, the ratio pI/G of the peak originating from polyiodide to the peak of the G band originating from the CNT in the Raman spectrum in Raman spectroscopy is greater than or equal to 0.2, and preferably greater than or equal to 0.3. The ratio of the peak originating from polyiodide appearing at 150 to 180 $cm^{-1}$ of a Raman shift to the peak of the G band originating from the CNT appearing near 1590 $cm^{-1}$ is calculated using a laser with a wavelength of 532 nm. When pI/G is less than 0.2, the gap portion is insufficiently filled, and charge transfer does not occur sufficiently. Since an effect of inhibiting the lattice vibration also becomes small, the degree of improvement of temperature properties also decreases. Therefore, pI/G is set to a value within the above range.

<Method for Producing Carbon Nanotube Composite>

A CNT composite of the present embodiment is produced by the following method. First, by a floating catalytic chemical vapor deposition (CCVD) method, a mixture containing a catalyst and a reaction accelerator is supplied to a carbon source, to generate a plurality of CNTs. A saturated hydrocarbon having a six membered-ring may be used as the carbon source, a metal catalyst such as iron may be used as the catalyst, and a sulfuric compound may be used as the reaction accelerator. In the present embodiment, taking into consideration that the proportion of SWNT decreases with an increase in a carrier gas flow rate, a raw material composition and a spraying condition are adjusted to increase the ratio of the CNTs having a double-walled or triple-walled structure.

In order to adjust the size of iron which is the catalyst such that the outer diameter of the outermost wall of the CNT is less than or equal to 5.0 nm, raw materials are supplied into a reactor by spraying such that a mist particle diameter is about 20 µm. Thereafter, a plurality of CNT bundles are twisted to produce a CNT aggregate.

Thereafter, the CNT aggregate is subjected to an acid treatment to remove the remaining iron catalyst. In the CNT aggregate obtained by CCVD, the catalyst, amorphous carbon, and the like are contained in large amounts, and the original properties of the CNT aggregate can be obtained by a high-purity formation process for removing these. In the present embodiment, the CNT obtained in the above process is heated at a predetermined temperature in the air, and the purity of the heated CNT is increased with a strong acid.

Then, the CNT bundle after the acid treatment is subjected to a doping treatment, to produce a CNT composite 11 and a CNT wire 1 in which gap portions of the CNT bundle are doped with elements of other type. In the doping treatment, one or more elements of other type selected from the group consisting of lithium (Li), sodium (Na), potassium (K), calcium (Ca), rubidium (Rb), cesium (Cs), strontium (Sr), barium (Ba), fluorine (F), chlorine (Cl), bromine (Br), or iodine are preferably doped. Since a dopant is injected into the CNT from the outer periphery side, when the CNT is a multi-walled CNT (MWNT), a layer located on a further outer periphery side is preferentially doped, and an internal layer is difficult to be doped. Accordingly, in the present embodiment, based on the inference that the amount of doping in the first layer to third layer is larger, and the amount of doping decreases in the fourth or subsequent layer, the ratio of the number of the CNTs having a double-walled or a triple-walled structure is greater than or equal to 75%. Thus, the amount of doping to the whole CNT bundle can be increased and an excellent doping effect is obtained. In the present embodiment, in order to introduce the element of other type in an aligned manner into the gap portions of the CNT bundle, the CNT bundle is fired in the atmosphere of 250° C. to 500° C. for 1 to 24 hours.

As described above, according to the present embodiment, a group of elements of other type 12 is introduced in an aligned manner into the gap portions 11B between the plurality of CNT 11a, 11a, . . . constituting the CNT bundle 11A. Accordingly, many carriers can be generated on the outermost wall (T2) of the CNT 11a or on the first inner wall or n-th inner wall from the outermost wall, and thus the number of the carriers contributing to conductivity to be increased and the conductivity of the CNT can be improved. Accordingly, higher conduction than that of a CNT composite subjected to a conventional doping treatment can be achieved. Therefore, the CNT composite 11 and the CNT wire 1 having greatly improved electrical properties can be provided. With the group of elements of other type 12 introduced into the gap portions 11B of the CNT bundle 11A an increase in the lattice vibration of the CNT caused by a temperature increase is suppressed. Accordingly, the CNT composite 11 having an excellent resistance temperature coefficient can be provided, and electrical properties can be greatly improved even in high temperature environments.

With the CNT bundle 11A including the CNTs 11a having the number of walls (two walls or three walls) that can maximize an effect of a doping treatment, a resistance even lower than that of a CNT wire of the related art can be achieved, and a resistivity substantially equivalent to the resistivity of copper ($1.68 \times 10^{-6}$ Ω·cm) or the resistivity of aluminum ($2.65 \times 10^{-6}$ Ω·cm) can be achieved.

In the, the CNT composite and the CNT wire according to the embodiment of the present disclosure have been described. However, the present disclosure is not limited to the embodiment described above, and various alterations and modifications are possible based on a technical concept of the present disclosure.

For example, a CNT covered electric wire may be formed which includes a wire formed by bundling the CNT composites of the above embodiment, and a covering layer that covers an outer periphery of the wire. Particularly, the CNT composite and the CNT wire of the present embodiment are suitable as a material for an electric wire for transmitting electric power and signals, and more suitable as an electric wire mounted on a movable body such as a four-wheeled vehicle. This is because the CNT composite and the CNT wire are more lightweight than a metal electric wire, and provide an expected improvement in fuel efficiency.

Further, a wire harness including at least one carbon nanotube covered electric wire may be formed.

EXAMPLES

Hereinafter, Examples of the present disclosure will be described. The present disclosure is not limited to Examples described below.

Example 1

Figure 6:
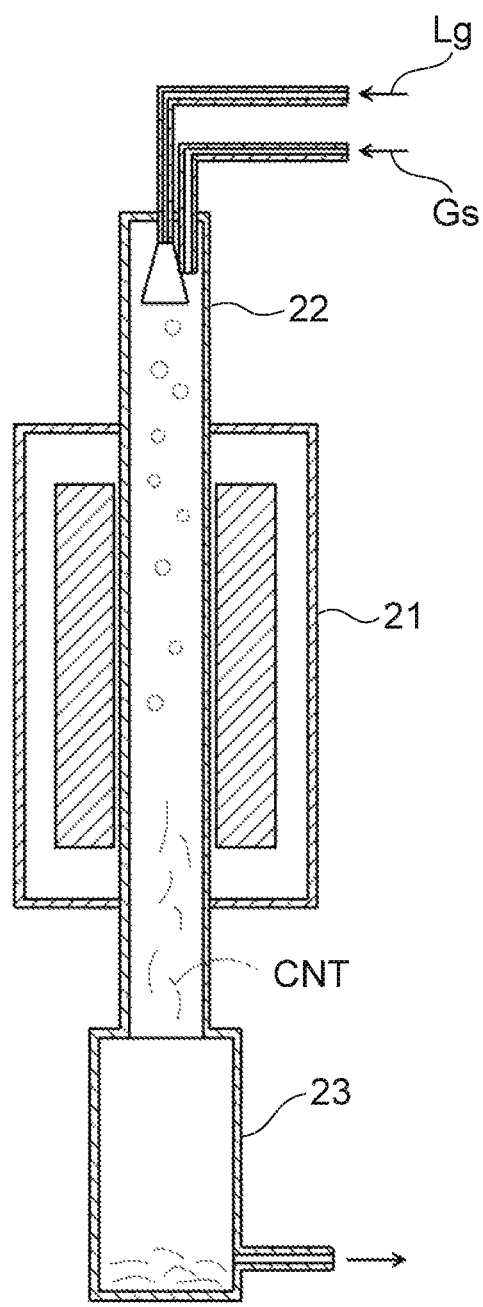
FIG. 6 is a diagram showing an example of a production apparatus which produces carbon nanotubes by a floating catalytic chemical vapor deposition method.

In a CNT production apparatus as shown in FIG. 6 using a floating catalytic chemical vapor deposition (CCVD)

method, a raw material solution Lq containing decahydronaphthalene which is a carbon source, ferrocene which is a catalyst, and thiophene which is a reaction accelerator was supplied by spraying into an alumina tube 22 having an inner diameter φ of 60 mm and a length of 1600 mm and heated to 1300° C. in an electric furnace 21. As a carrier gas Gs, hydrogen was supplied at 9.5 L/min. The obtained CNTs were taken up in a sheet form by a take-up machine 23, and the sheet was rolled and twisted to produce a CNT bundle. Thereafter, the obtained CNT bundle was heated to 500° C. in the air, and further subjected to an acid treatment to increase the purity. Then, the CNT bundle having the increased purity was subjected to a doping treatment by firing in the atmosphere of 250° C. to 500° C. for 1 to 24 hours using iodine, to obtain a CNT composite doped with iodine.

Example 2

A CNT composite was produced by the similar method as that in Example 1 except that a doping treatment was performed using bromine as a dopant in place of iodine, and the CNT composite doped with bromine was obtained.

Example 3

A CNT composite was produced by the similar method as that in Example 1 except that iodine was used as a dopant, and the doped amount of iodine was more than that in Example 1, and the CNT composite doped with iodine was obtained.

Example 4

A CNT composite was produced by the similar method as that in Example 1 except that iodine was used as a dopant; the doped amount of iodine was more than that in Example 1; and further, a firing temperature was set to 400 to 600° C., and the CNT composite doped with iodine was obtained.

Example 5

A CNT composite was produced by the similar method as that in Example 1 except that bromine was used as a dopant, and the doped amount of bromine was more than that in Example 2, and the CNT composite doped with bromine was obtained.

Example 6

A CNT composite was produced by the similar method as that in Example 1 except that bromine was used as a dopant; the doped amount of bromine was more than that in Example 2; and further, a firing temperature was set to 400 to 600° C., and the CNT composite doped with bromine was obtained.

Comparative Example 1

In Comparative Example 1, a CNT composite having a single-walled structure and doped with iodine was obtained. The resistivity, doped amount, and pI/G ratio of the obtained CNT composite were measured by the similar methods as those of Examples.

Comparative Example 2

A CNT bundle was produced by the similar method as that in Example 1 except that a doping treatment was not performed. The resistivity, doped amount, and pI/G ratio of the obtained CNT composite were measured by the similar methods as those of Examples.

Comparative Example 3

Based on Example 6 of National Publication of International Patent Application No. 2014-517797, a double-walled CNT bundle was placed in iodine vapor at 200° C. for 10 hours, to produce the CNT bundle doped with iodine. The resistivity, doped amount, and pI/G ratio of the obtained CNT composite were measured by the similar methods as those of Examples.

Thereafter, the structure and properties of the CNT composite were measured and evaluated according to the following method.

(a) Evaluation of Arrangement (Orientation) of Dopant

Figure 7:
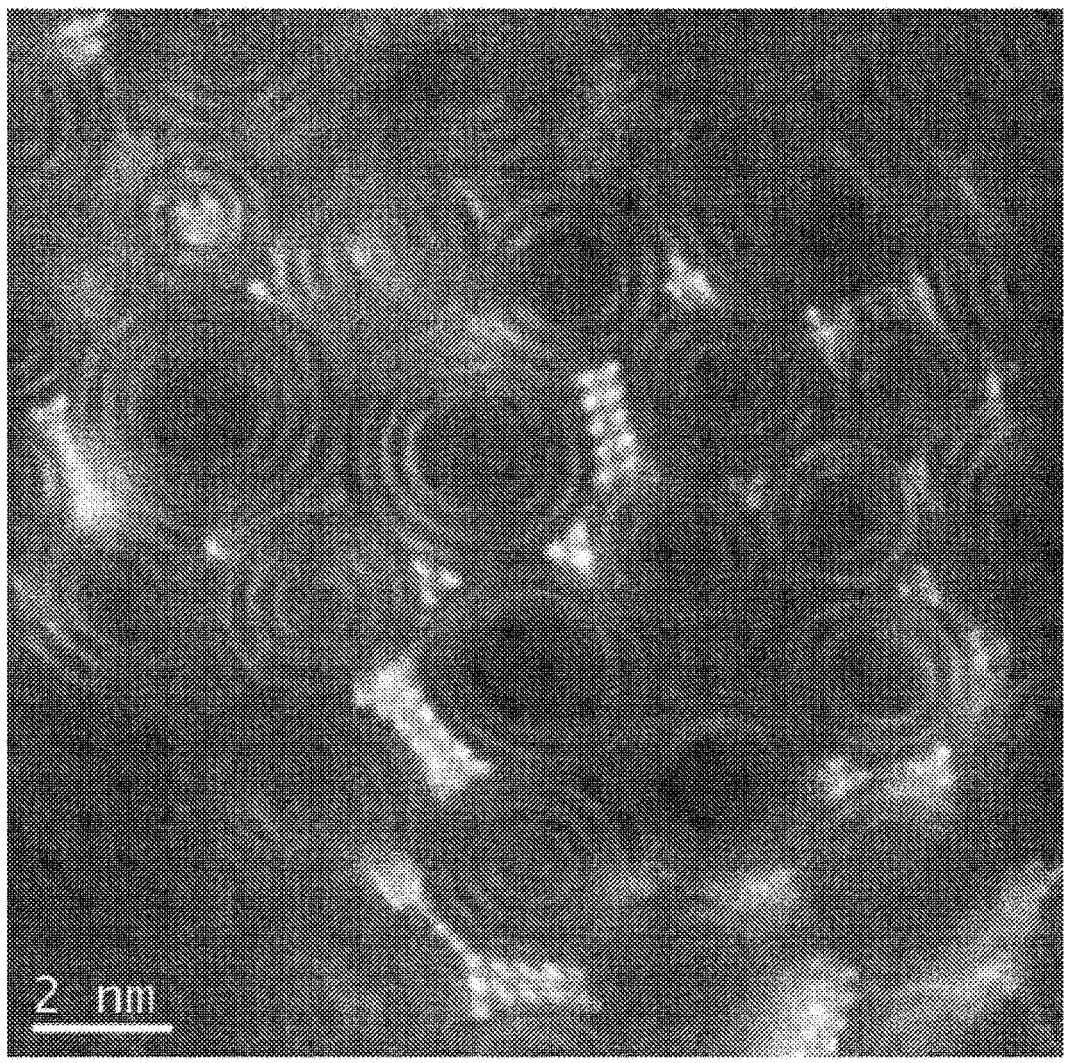
FIG. 7 is an electron microscope image showing the cross section of a carbon nanotube composite in the present Examples.
Figure 8A:
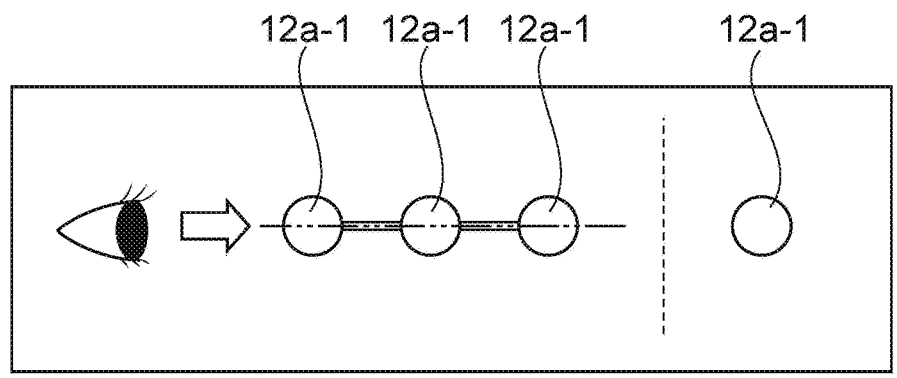
FIGS. 8A and 8B are diagrams illustrating the relationship between the brightness of the constitutional units of the group of elements of other type in the electron microscope image of FIG. 7 and the orientation of the constitutional units.
Figure 8B:
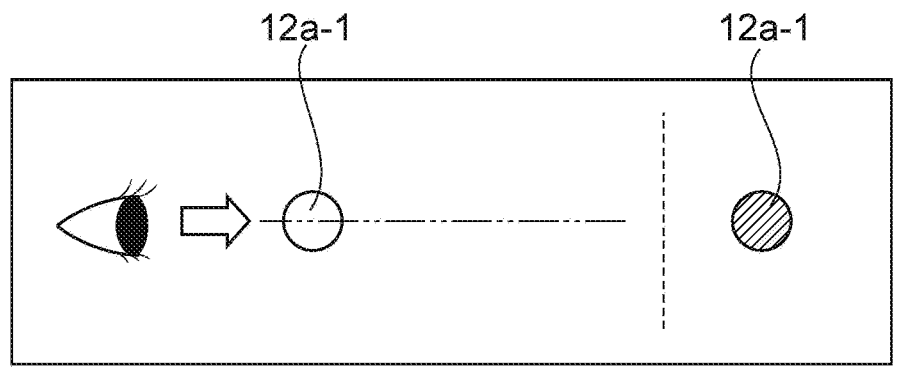

The cross section of the CNT composite generated under the above conditions was observed and analyzed by a transmission electron microscope as shown in FIG. 7, and the orientation of the doped element with which gap portions were filled was visually determined based on the brightness of the doped element (polyiodide in FIG. 7). Specifically, as shown in FIG. 8A, in the cross section of the CNT composite, in a portion having a relatively strong emission intensity, three iodine elements 12a-1, 12a-1, 12a-1 constituting polyiodide ($I_3$) can be determined to be oriented in line in an optical axis direction. The optical axis direction and the axial direction of a CNT were substantially parallel to each other, whereby the three iodine elements 12a-1, 12a-1, 12a-1 were determined to be arranged in line along the axis direction of the CNT ("good"). On the other hand, in a portion having relatively weak emission intensity (FIG. 8B)), the three iodine elements forming polyiodide (L) were not oriented substantially parallel to the optical axis direction. It was determined that one iodine elements 12a-1 was located, or two iodine elements were located ("poor").

(b) Measurement of Doped Amount in CNT Composite

The doped amount (content) of iodine with which the CNT composite was doped in the CNT composite generated under the above conditions was measured by combustion-ion chromatography (CIC, manufactured by Thermo Fisher Scientific, device name: "ICS-3000").

(c) Measurement of pI/G Ratio in CNT Composite

Figure 9A:
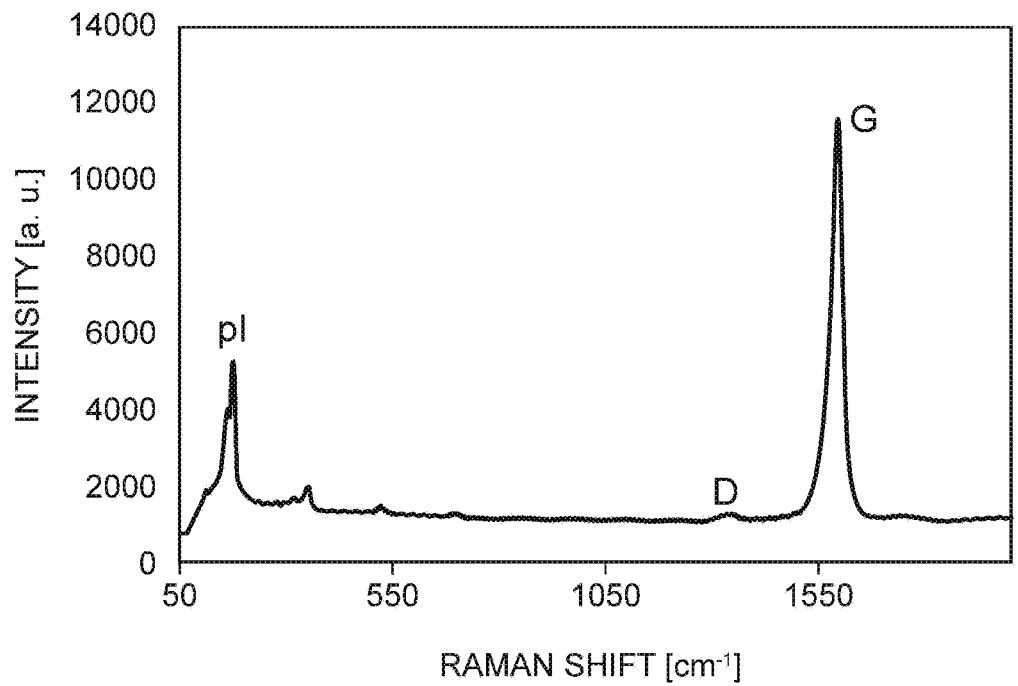
FIGS. 9A and 9B are graphs showing Raman spectra originating from CNTs and polyiodide in a Raman spectrum spectroscopic method, respectively.
Figure 9B:
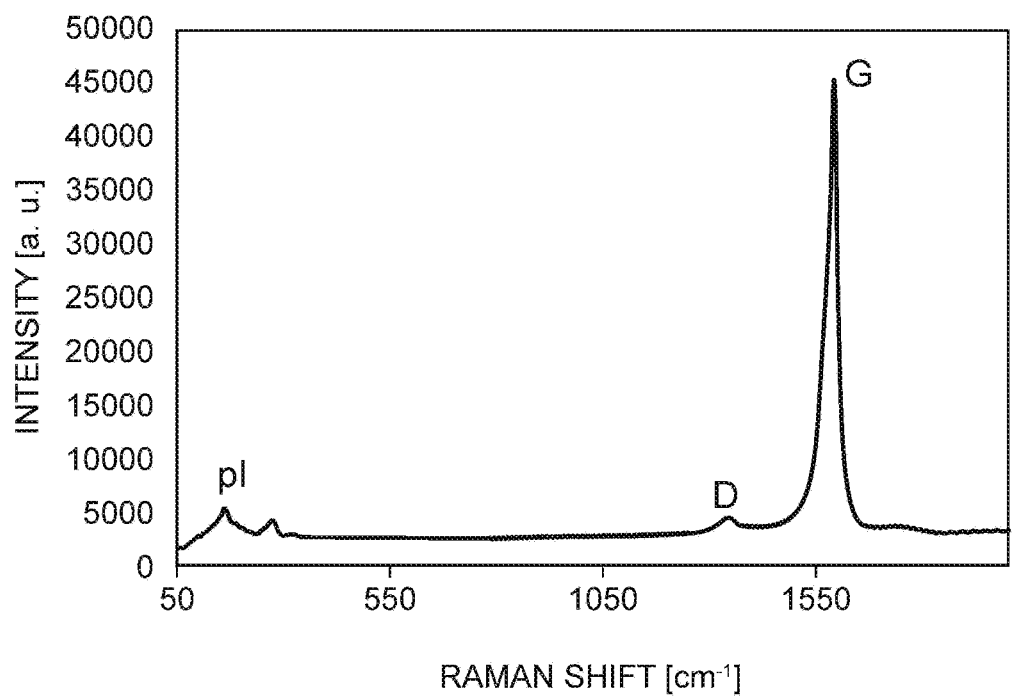

A Raman spectrum was obtained by measurement under conditions of pump laser: 532 nm, laser intensity: reduction in light to 10%, object lens: 50 times, exposure time: 1 second×60 times with a Raman spectrometric device (manufactured by Thermo Fisher Scientific, device name: "ALMEGA XR"). Thereafter, Raman spectrum data at 100 to 2000 $cm^{-1}$ was extracted by a spectral analysis software Spectra Manager manufactured by JASCO Corporation, and a peak group detected in this range was subjected to separation analysis using Curve Fitting. A baseline is taken as a line connecting detected intensities at 100 $cm^{-1}$ and 2000 $cm^{-1}$. A graph showing Raman spectra originating from the CNT and originating from the polyiodide is shown in FIGS. 9A and 9B. A peak detected with the largest intensity near 1590 $cm^{-1}$ in a G band is a G+ band, and a peak observed near 1550 to 1590 $cm^{-1}$ on a lower wave number side is a G-band. D band is a peak originating from the defect (crystallinity) of the CNT. pI/G ratio was calculated from respective peak top heights of the spectra originating from the G band and iodine from the Raman spectrum cut down as above (detected intensity obtained by subtracting the value of the baseline from the peak top).

(d) Measurement of Resistivity of CNT Composite

The CNT composite was connected to a resistance measurement machine (manufactured by Keithley Instruments, Inc., device name: "DMM2000"), and resistance measurement was carried out by a four-terminal method. Resistivity was calculated based on the calculating formula: r=RA/L (R: resistance, A: cross-sectional area of CNT composite, L: measured length).

The result of measurements of the above-mentioned Examples 1 to 6 and Comparative Examples 1 to 3 are shown in Table 1.

TABLE 1

|  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Dopant (different element) | Iodine | Bromine | Iodine | Iodine | Bromine | Bromine | Iodine | None | Iodine |
| Orientation of dopant | Good | Good | Good | Good | Good | Good | Poor | — | Poor |
| Doped amount (% by atom) | 1.3 | 1.4 | 2.1 | 5.3 | 1.9 | 4.8 | 0.24 | — | 0.56 |
| Doped amount (% by mass) | 12 | 8.5 | 19 | 49 | 12 | 29 | 2.2 | — | 5.2 |
| pI/G ratio | 0.40 | — | 7.7 | 19.6 | — | — | 0.070 | — | 0.15 |
| Resistivity ($\Omega \cdot cm$) | $8.5 \times 10^{-6}$ | $1.2 \times 10^{-5}$ | $9.6 \times 10^{-6}$ | $1.1 \times 10^{-5}$ | $2.0 \times 10^{-5}$ | $2.2 \times 10^{-5}$ | $3.4 \times 10^{-5}$ | $7.8 \times 10^{-5}$ | $2.5 \times 10^{-5}$ |

In Examples 1 to 6, clear spectral peaks originating from the G band and the D band were observed near 1000 to 2000 $cm^{-1}$. In Examples 1, 3, and 4, a spectral peak originating from polyiodide was observed at 150 to 180 $cm^{-1}$. In Example 1, the doped amount of iodine was 1.3% by atom (12% by mass); the pI/G ratio was 0.40 (FIG. 9A); and the resistivity was $8.5 \times 10^{-6}$ $\Omega \cdot cm$. In Example 2, the doped amount of bromine was 1.4% by atom (8.5% by mass), and the resistivity was $1.2 \times 10^{-5}$ $\Omega \cdot cm$. In Example 3, the doped amount of iodine was 2.1% by atom (19% by mass); the pI/G ratio was 7.7; and the resistivity was $9.6 \times 10^{-6}$ $\Omega \cdot cm$. In Example 4, the doped amount of iodine was 5.3% by atom (49% by mass); the pI/G ratio was 19.6; and the resistivity was $1.1 \times 10^{-5}$ $\Omega \cdot cm$. In Example 5, the doped amount of bromine was 1.9% by atom (12% by mass), and the resistivity was $2.0 \times 10^{-5}$ $\Omega \cdot cm$. In Example 6, the doped amount of bromine was 4.8% by atom (29% by mass), and the resistivity was $2.2 \times 10^{-5}$ $\Omega \cdot cm$.

On the other hand, in Comparative Example 1, the doped amount of iodine was 0.24% by atom (2.2% by mass); the pI/G ratio was 0.070 (FIG. 9B)); the resistivity was $3.4 \times 10^{-5}$ $\Omega \cdot cm$; the doped amount was less than 1% by atom; the pI/G ratio was less than 0.2, and the resistivity was poorer than that of each of Examples 1 to 6.

In Comparative Example 2 subjected to no doping treatment, the resistivity was $7.8 \times 10^{-5}$ $\Omega \cdot cm$, and the resistivity was poorer than that of each of Examples 1 to 6.

In the CNT composite doped with iodine in Comparative Example 3, the resistivity was $2.5 \times 10^{-5}$ $\Omega \cdot cm$, and the resistivity was poorer than that of each of Examples 1 to 6.

Therefore, it was found that, when the gap portions of the CNT bundle are filled with iodine which is the dopant, to form an iodine group; the polyiodide forming the iodine group are arranged in line along the longitudinal direction of the CNT; and among others, the doped amount of the iodine is greater than or equal to 1.3% by atom, lower resistance and higher conduction than those of a CNT composite of the related art can be achieved.

(e) Influence of Temperature Environment

Figure 10:
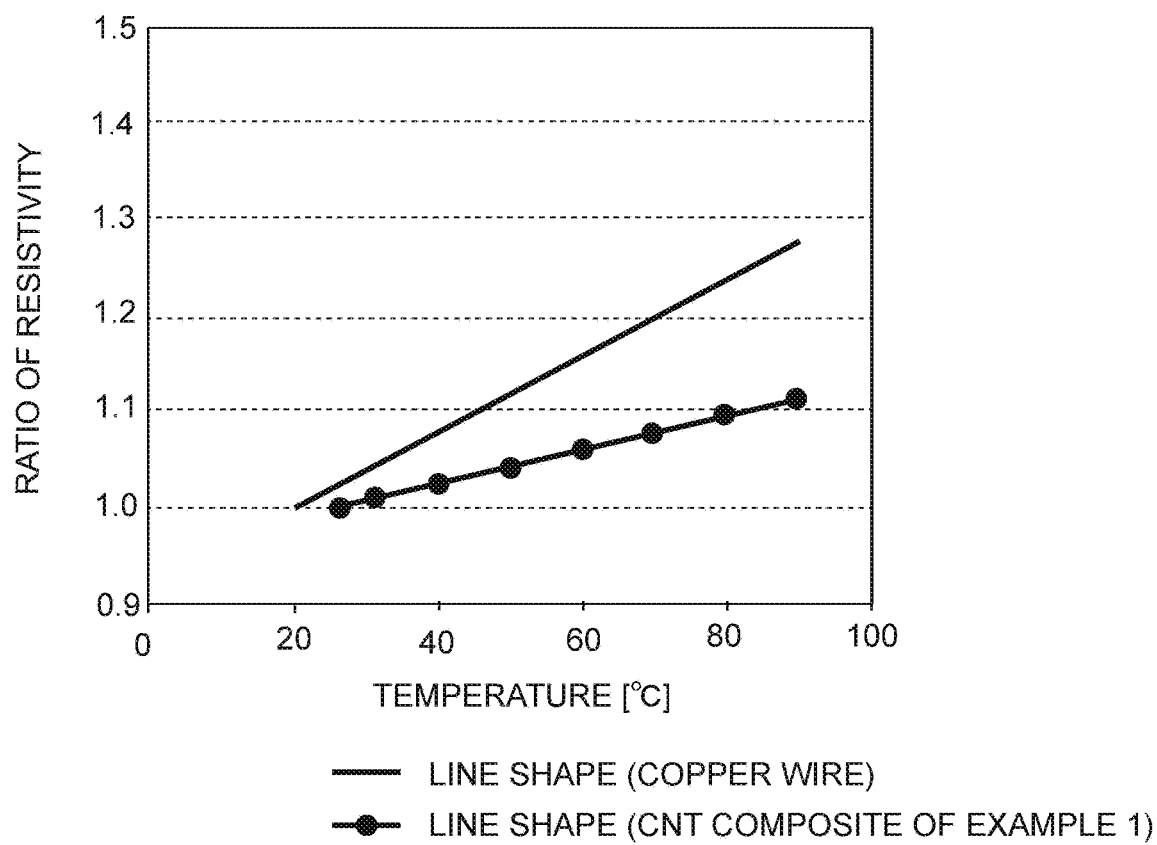
FIG. 10 is a graph showing the ratio of resistivity at various temperature to resistivity at room temperature for a CNT composite of the present disclosure and a copper wire.

The influence of temperature on the resistivity of the CNT bundle of Example 1 was compared with that of the copper wire (copper). The CNT composite or the copper wire was connected to a resistance measurement machine (manufactured by Keithley Instruments, Inc., device name: "DMM2000"), and resistance measurement was carried out by a four-terminal method. Resistivity was calculated based on the calculating formula: r=RA/L (R: resistance, A: cross-sectional area of wire, L: measured length). The ratio of the resistivity at each temperature to the resistivity at room temperature was calculated. The results are shown in the graph of FIG. 10. From the comparison results, it was found that an increase rate of the resistivity caused by a temperature increase in the CNT composite of the present disclosure is lower than that in the copper wire, and the CNT composite is superior in high conductivity in high temperature environments to the copper wire.

What is claimed is:

1. A carbon nanotube composite comprising:
   a carbon nanotube bundle including a plurality of carbon nanotubes that are bundled, each of the plurality of carbon nanotubes having a multi-walled structure; and
   a group of elements of other type introduced in an aligned manner into a gap portion between the plurality of carbon nanotubes,
   in the carbon nanotube bundle, a ratio of the number of carbon nanotubes having a double-walled or triple-walled structure to the number of the plurality of carbon nanotubes being greater than or equal to 50%,
   other-type element bonded bodies constituting the group of elements of other type being arranged in line along a longitudinal direction of outermost walls of the carbon nanotubes having the double-walled or triple-walled structure,
   wherein a plurality of elements of other type constituting the other-type element bonded bodies consist of polyiodine,
   the gap portion between the plurality of carbon nanotubes is doped only with iodine, and
   the content of the group of elements of other type in the carbon nanotube composite is greater than or equal to 1% by atom and less than or equal to 2.5% by atom.

2. The carbon nanotube composite according to claim 1, wherein each element of a plurality of elements of other type constituting the other-type element bonded body is arranged at a certain distance from a center of a radial-direction cross section of the carbon nanotube.

3. The carbon nanotube composite according to claim 1, wherein:
   a distance between iodine elements adjacent to each other in the other-type element bonded body is 2.6 angstroms to 3.0 angstroms.

4. The carbon nanotube composite according to claim 3, wherein:
   a ratio pI/G of a peak originating from polyiodide to a peak of a G band originating from the carbon nanotubes in a Raman spectrum in Raman spectroscopy is greater than or equal to 0.2.

5. The carbon nanotube composite according to claim 1 wherein, in the carbon nanotube bundle, a ratio of the number of the carbon nanotubes having a double-walled or triple-walled structure to the number of the plurality of carbon nanotubes is greater than or equal to 75%.

6. A carbon nanotube wire comprising a plurality of carbon nanotube composites that are bundled,
- each of the plurality of carbon nanotube composites including:
  - a carbon nanotube bundle including a plurality of carbon nanotubes that are bundled, each of the plurality of carbon nanotubes having a multi-walled structure; and
  - a group of elements of other type introduced in an aligned manner into a gap portion between the plurality of carbon nanotubes,
- in the carbon nanotube bundle, a ratio of the number of carbon nanotubes having a double-walled or triple-walled structure to the number of the plurality of carbon nanotubes being greater than or equal to 50%,
- other-type element bonded bodies constituting the group of elements of other type being arranged in line along a longitudinal direction of outermost walls of the carbon nanotubes having the double-walled or triple-walled structure,
- wherein a plurality of elements of other type constituting the other-type element bonded bodies consist of polyiodine,
- the gap portion between the plurality of carbon nanotubes is doped only with iodine, and
- the content of the group of elements of other type in the carbon nanotube composite is greater than or equal to 1% by atom and less than or equal to 2.5% by atom.

* * * * *